United States Patent
Lin et al.

(10) Patent No.: US 11,782,300 B2
(45) Date of Patent: Oct. 10, 2023

(54) DISPLAY DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Yuhang Lin, Beijing (CN); Hui Yu, Beijing (CN); Liri Chen, Beijing (CN); Chengkun Liu, Beijing (CN); Han Zhang, Beijing (CN); Ming Chen, Beijing (CN); Jie Liu, Beijing (CN); Kai Diao, Beijing (CN)

(73) Assignees: Fuzhou BOE Optoelectronics Technology Co., Ltd., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 17 days.

(21) Appl. No.: 17/486,455

(22) Filed: Sep. 27, 2021

(65) Prior Publication Data

US 2022/0163838 A1     May 26, 2022

(30) Foreign Application Priority Data

Nov. 20, 2020    (CN) .......................... 202022716728.8

(51) Int. Cl.
    *G02F 1/1333*     (2006.01)
    *G02F 1/1335*     (2006.01)

(52) U.S. Cl.
    CPC .. *G02F 1/133317* (2021.01); *G02F 1/133314* (2021.01); *G02F 1/133512* (2013.01)

(58) Field of Classification Search
    CPC ......... G02F 1/133314; G02F 1/133512; G02F 1/133317
    See application file for complete search history.

(56) References Cited

U.S. PATENT DOCUMENTS

2013/0263488 A1*   10/2013   Wu ................... G02F 1/133308
                                                          156/305
2014/0055708 A1    2/2014   Yu et al.
(Continued)

FOREIGN PATENT DOCUMENTS

CN     102809834 A     12/2012
CN     103235432 A     8/2013
(Continued)

*Primary Examiner* — Michael H Caley
*Assistant Examiner* — Agnes Dobrowolski
(74) *Attorney, Agent, or Firm* — HOUTTEMAN LAW LLC

(57) ABSTRACT

The present disclosure provides a display device, including: a backlight module; side frames on different sides of the display module; a first supporting part is provided on at least one side frame, and extends toward a middle part of the backlight module; a panel assembly on a light-emitting side of the backlight module and including a first display panel, a second display panel and a connection layer between the first display panel and the second display panel, where the first display panel, the second display panel and the connection layer define an accommodation space, the first supporting part extends into the accommodation space, the first display panel is on a side of the first supporting part away from the backlight module, and the second display panel is supported by the backlight module; the first display panel and the side frame overlap in a thickness direction of the display device.

14 Claims, 4 Drawing Sheets

(56) References Cited

U.S. PATENT DOCUMENTS

| | | | |
|---|---|---|---|
| 2014/0333870 A1 | 11/2014 | Zhang | |
| 2016/0238781 A1* | 8/2016 | Zhao | G02B 6/005 |
| 2016/0363804 A1* | 12/2016 | Son | G02F 1/13336 |
| 2019/0278118 A1* | 9/2019 | Shao | G02F 1/13471 |
| 2021/0364856 A1 | 11/2021 | Su et al. | |

FOREIGN PATENT DOCUMENTS

| | | |
|---|---|---|
| CN | 107505671 A | 12/2017 |
| CN | 110850625 A | 2/2020 |

\* cited by examiner

DISPLAY DEVICE

CROSS-REFERENCE TO RELATED APPLICATIONS

The present application claims the priority of Chinese Patent Application NO. 202022716728.8, filed on Nov. 20, 2020, the contents of which are incorporated herein in their entirety by reference.

TECHNICAL FIELD

The present disclosure relates to the field of display technology, and in particular, to a display device.

BACKGROUND

The dual cell panel technology is a novel liquid crystal display technology, and compared with a conventional liquid crystal display module, the dual cell panel technology adds one liquid crystal display panel, so that a control capability on luminous flux of backlight is increased, and a contrast of a display device is improved. However, the display device using the dual cell panel has a relatively wide bezel.

SUMMARY

The present disclosure provides a display device, including:

a backlight module;

a plurality of side frames positioned at a periphery of the backlight module, the side frames are respectively positioned on different sides of the display module, and are coupled to the backlight module; a first supporting part is provided on at least one of the side frames, and the first supporting part extends towards a middle part of the backlight module;

a panel assembly positioned on a light-emitting side of the backlight module, the panel assembly includes a first display panel, a second display panel and a connection layer, wherein the connection layer is connected between the first display panel and the second display panel, the first display panel, the second display panel and the connection layer define an accommodation space, the first supporting part extends into the accommodation space, the first display panel is positioned on a side of the first supporting part away from the backlight module, and the second display panel is positioned on a side of the first supporting part proximal to the backlight module and supported by the backlight module.

In some implementations, the first display panel overlaps with the side frame in an overlap region along a direction in which the first display panel extends.

In some implementations, a first adhesive layer is disposed on a surface of each side frame facing the backlight module, and the backlight module is adhered to each side frame through the first adhesive layer.

In some implementations, the backlight module includes:

a back plate formed with an accommodating part;

a backlight assembly disposed in the accommodating part;

a glue frame including a retaining wall and a second supporting part on the retaining wall, and the retaining wall is arranged around the back plate;

the side frame is positioned on a side of the retaining wall away from the back plate, the second display panel is supported by the second supporting part.

In some implementations, a hook is arranged on one of the side frame and the glue frame, and a slot is arranged on the other one of the side frame and the glue frame, and the hook is clamped in the slot.

In some implementations, a second adhesive layer is disposed between the second supporting part and the second display panel.

In some implementations, the second adhesive layer includes a foam adhesive tape.

In some implementations, the connection layer includes an adhesive layer.

In some implementations, a first buffer layer is disposed on a surface of the first supporting part facing the first display panel, and a second buffer layer is disposed on a surface of the first supporting part facing the second display panel.

In some implementations, there is a first distance between the first buffer layer and the first display panel, and there is a second distance between the second buffer layer and the second display panel.

In some implementations, each of the first distance and the second distance ranges from 0.05 mm to 0.1 mm.

In some implementations, the first display panel includes an array substrate and an opposite substrate which are oppositely disposed, and edge sealing layers are disposed on side surfaces of the array substrate and the opposite substrate facing the side frame.

In some implementations, the edge sealing layer on the side surface of the array substrate facing the side frame and the edge sealing layer on the side surface of the opposite substrate facing the side frame are formed into a single piece as a light shielding layer.

In some implementations, the backlight module has a first edge, a second edge, a third edge and a fourth edge, the array substrate includes a first driving region proximal to the fourth edge, and the display device further includes a first flexible printed circuit coupled to the first driving region; the number of the side frames is three, and the three side frames are respectively adjacent to the first edge, the second edge and the third edge.

In some implementations, an orthographic projection of an edge of the first supporting part away from the side frame on the first display panel is a straight line or a curved line.

In some implementations, the first supporting part on a same one of the side frames is a continuous structure, or the first supporting part on the same one of the side frames includes a plurality of parts arranged at intervals.

In some implementations, the display device further includes a protective shell, a protective space is defined between the protective shell and the backlight module, and a part of the first flexible printed circuit is positioned in the protective space.

DESCRIPTION OF DRAWINGS

The accompanying drawings, which are included to provide a further understanding of the present disclosure and are incorporated in and constitute a part of this specification, illustrate embodiments of the present disclosure and together with the description serve to explain the present disclosure, but do not constitute a limitation of the present disclosure. In the drawings.

DESCRIPTION OF EMBODIMENTS

The following detailed description of the embodiments of the present disclosure refers to the accompanying drawings. It should be understood that the detailed description and specific examples, while indicating the present disclosure, are given by way of illustration and explanation only, not limitation.

Figure 1:
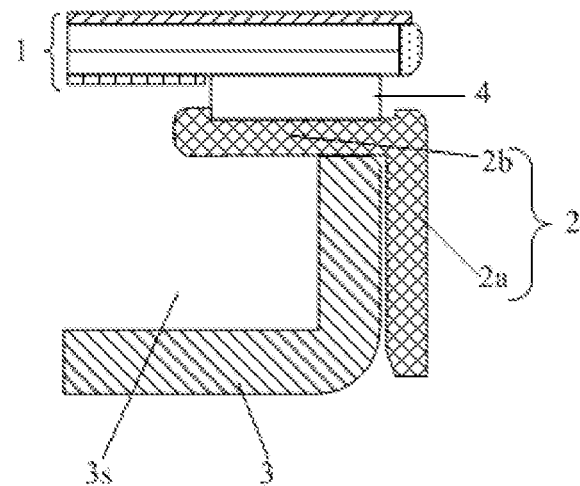
FIG. 1 is a partial schematic diagram of a display device.

FIG. 1 is a partial schematic diagram of a display device, as shown in FIG. 1, the display device includes: a display panel 1, a glue frame 2, and a back plate 3. The back plate 3 has an accommodating part 3s, an optical film may be disposed in the accommodating part 3s, the glue frame 2 includes a retaining wall 2a and a supporting part 2b on the retaining wall 2a, the retaining wall 2a is disposed at a periphery of the back plate 3, an end of the supporting part 2b is disposed on the retaining wall 2a, and another end of the supporting part 2b extends in a direction away from the retaining wall 2a. The display panel 1 may be adhered to the supporting part 2b of the glue frame 2 by a foam adhesive tape 4. With an arrangement of FIG. 1, a narrow bezel of the display device can be realized. However, when the display device is used while being tilted, the gravity of the display panel 1 causes a peeling force to the foam adhesive tape 4. With a lapse of time or under a relatively high temperature condition, the foam adhesive tape 4 may slowly age, and an adhesive force thereof may decrease, thereby increasing a risk of the display panel 1 falling off.

Figure 2:
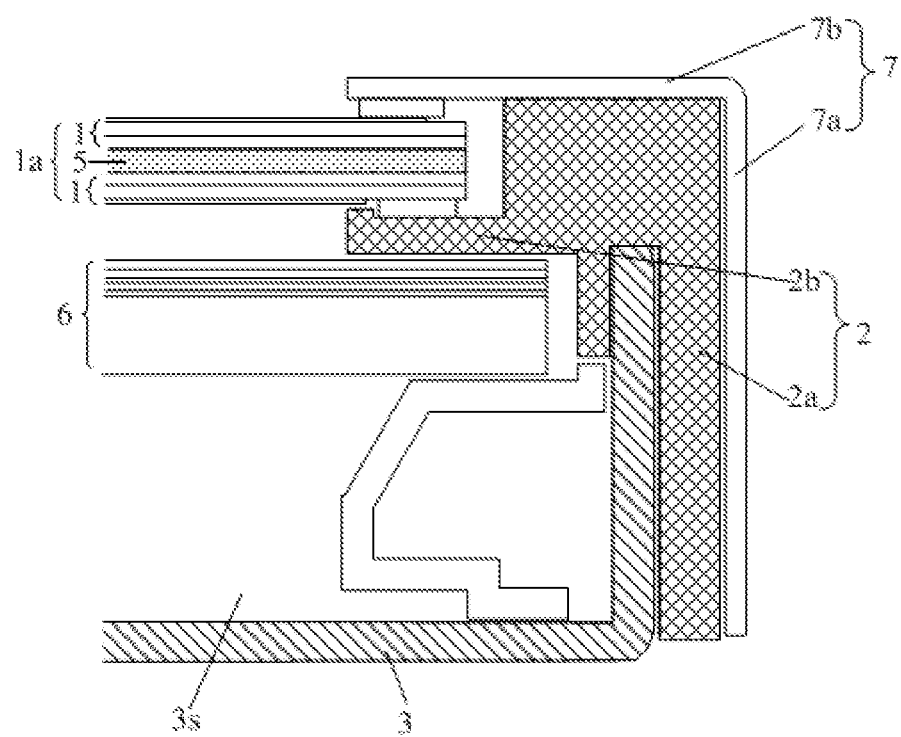
FIG. 2 is a partial schematic diagram of another display device.

The dual cell panel is formed by attaching two display panels of a same size together by means of an adhesive layer, which results in an increased weight of the dual cell panel, and therefore, there is a higher risk of the display panels falling off when the dual cell panel is fixed in the manner of FIG. 1. FIG. 2 is a partial schematic diagram of another display device, and as shown in FIG. 2, the display device includes a dual cell panel 1a, a back plate 3, a glue frame 2 and a front frame 7, the dual cell panel includes two display panels 1, the two display panels 1 are adhered by an adhesive layer 5, the glue frame 2 includes a supporting part 2b and a retaining wall 2a, the retaining wall 2a is disposed at a periphery of the back plate 3, and an optical film set 6 is disposed in an accommodating part 3s of the back plate 3. The dual cell panel 1a is supported by the supporting part 2b, and the front frame 7 includes a side wall 7a and a shielding part 7b, the shielding part 7b covering an edge of the dual cell panel 1a. With an arrangement of FIG. 2, the dual cell panel 1a can be prevented from falling off, but it is adverse to realize a narrow bezel.

Figure 3:
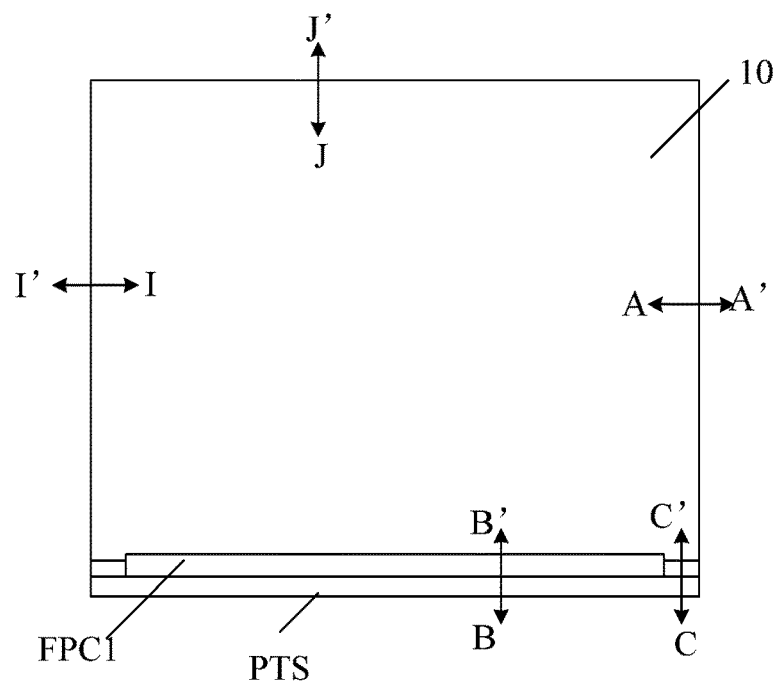
FIG. 3 is a schematic plan view of a display device according to an embodiment of the present disclosure.
Figure 4:
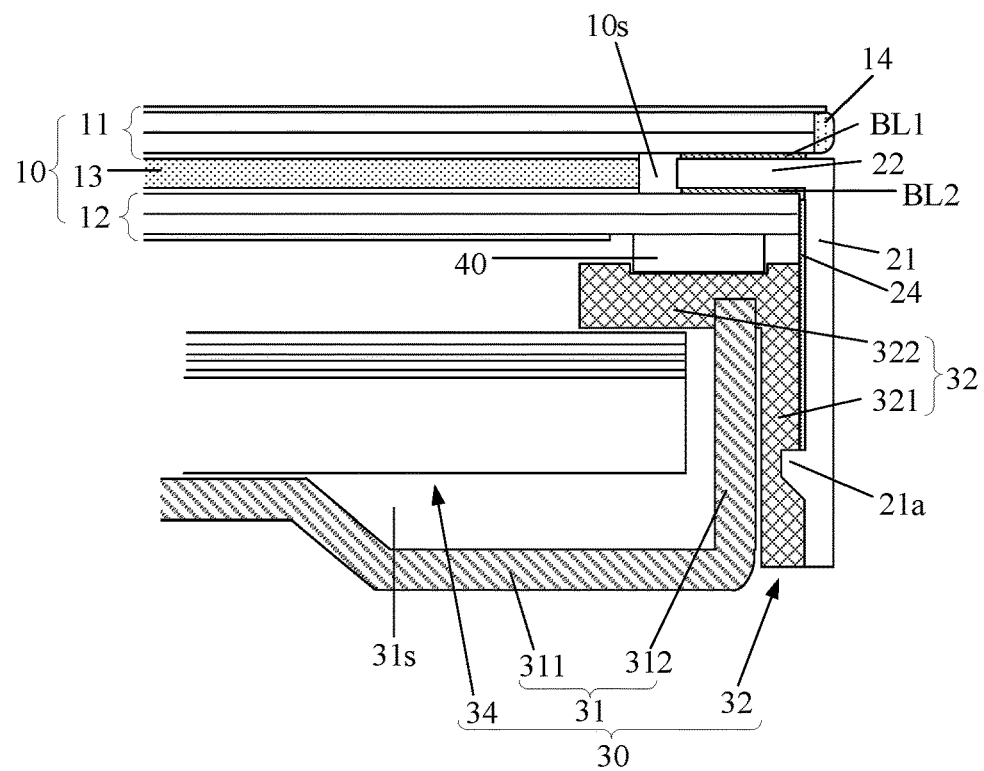
FIG. 4 is a cross-sectional view taken along line A-A' of FIG. 3.

FIG. 3 is a schematic plan view of a display device according to an embodiment of the present disclosure, and FIG. 4 is a cross-sectional view taken along A-A' line in FIG. 3, and as shown in FIGS. 3 and 4, the display device includes a panel assembly 10, a backlight module 30, and a plurality of side frames 21 positioned at a periphery of the backlight module 30.

The side frames 21 are respectively positioned at different sides of the backlight module 30, a first supporting part 22 is provided on at least one of the side frames 21, and the first supporting part 22 extends from the side frame 21 toward a middle part of the backlight module 30. The first supporting part 22 and the side frame 21 may be formed into a single piece, and the side frame 21 and the first supporting part 22 each may be made of metal or may be an injection-molded part. The side frames 21 may form a semi-enclosed structure.

Figure 5:
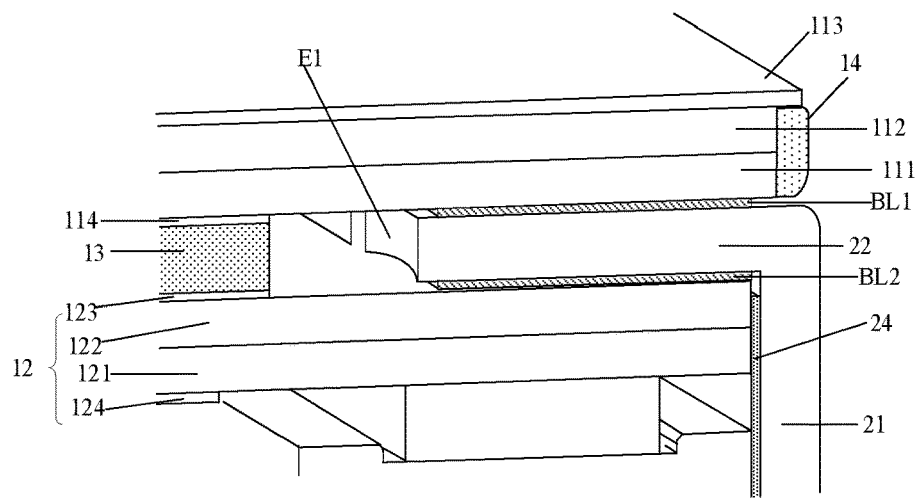
FIG. 5 is a partial perspective view of a display device according to an embodiment of the present disclosure.
Figure 6:
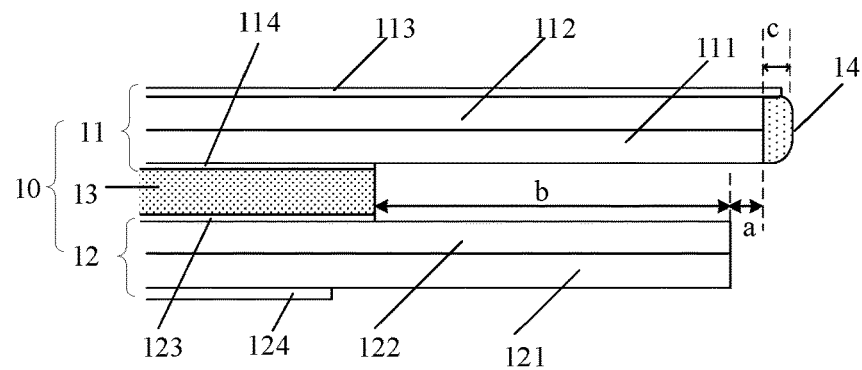
FIG. 6 is a cross-sectional view of a panel assembly according to an embodiment of the present disclosure.

FIG. 5 is a partial perspective view of a display device according to an embodiment of the present disclosure, and FIG. 6 is a cross-sectional view of a panel assembly according to an embodiment of the present disclosure, as shown in FIG. 4 to FIG. 6, the panel assembly 10 is positioned on a light-emitting side of the backlight module 30, the light-emitting side of the backlight module 30 refers to a side of the backlight module 30 in a light emitting direction, and in FIG. 4, the light-emitting side of the backlight module 30 is an upper side of the backlight module 30. The panel assembly 10 includes: a first display panel 11 and a second display panel 12, where the first display panel 11 is positioned on a side of the second display panel 12 away from the backlight module 30. The first display panel 11 and the second display panel 12 each are a liquid crystal panel, the first display panel 11 is configured to perform a normal display, and the second display panel 12 is configured to adjust light, so that the panel assembly 10 has a relatively high contrast. The panel assembly 10 may further include a connection layer 13 connected between the first display panel 11 and the second display panel 12. The connection layer 13 is, for example, a transparent adhesive layer. The first display panel 11, the second display panel 12 and the connection layer 13 define an accommodation space 10s, the first supporting part 22 extends into the accommodation space 10s, the first display panel 11 is positioned on a side of the first supporting part 22 away from the backlight module 30, and the second display panel 12 is positioned on a side of the first supporting part 22 proximal to the backlight module 30 and supported by the backlight module 30.

In some implementations, as shown in FIG. 5, the first supporting part 22 has a first edge E1 away from the side frame 21, and an orthographic projection of the first edge E1 of the first supporting part 22 on the first display panel 11 may be a straight line or a curved line, for example, the curved line may be wavy.

In some implementations, the first supporting part 22 on a same one of the side frames 21 may be a continuous structure, or the first supporting part 22 on the same one of the side frames includes a plurality of parts arranged at intervals.

Specifically, each first supporting part 22 may extend from the side frame 21 in a direction away from the side frame 21.

In some implementations, the first display panel 11 may overlap with the side frame 21 in an overlap region.

Specifically, the first display panel 11 may overlap with the side frame 21 in an overlap region along a direction in which the first display panel 11 extends, for example, there is an overlap between an orthographic projection of the first display panel 11 and an orthographic projection of the side frame 21 on a plane in which the first display panel 11 extends.

In the embodiment of the present disclosure, the first display panel 11, the second display panel 12 and the connection layer 13 define the accommodation space 10s, and the first supporting part 22 on the side frame 21 extends into the accommodation space 10s, so that when the display device is used while being titled (for example, the first display panel 11 and the second display panel 12 each form a non-zero included angle with respect to a horizontal plane), the second display panel 12 can be prevented from being separated from the backlight module 30 by a blocking effect of the first supporting part 22, and the first display panel 11 is adhered to the second display panel 12 through the connection layer 13, thus the first display panel 11 can be prevented from falling off under a connection effect of the connection layer 13. In addition, since the first display panel 11 overlaps with the side frame 21 in the overlap region along the direction in which the first display panel 11 extends, a distance between an edge of the first display panel 11 and an edge of the display device can be reduced, thereby facilitating to achieve a narrow bezel.

Since the first display panel 11 overlaps with the side frame 21 in the overlap region along the direction in which the first display panel 11 extends, and the second display panel 12 is positioned on the side of the first supporting part 22 proximal to the backlight module 30, as shown in FIG. 6, an edge of at least one side of the first display panel 11 exceeds an edge of the second display panel 12 by a distance a ranging from 1.0 mm to 1.4 mm, for example, a is equal to 1.2 mm. In addition, a distance b between an edge of the second display panel 12 proximal to the side frame 21 and an edge of the connection layer 13 proximal to the side frame 21 ranges from 4.5 mm to 5.5 mm. For example, b is equal to 5 mm.

As shown in FIG. 6, the first display panel 11 includes a first array substrate 111 and a first opposite substrate 112, and a liquid crystal layer may be disposed between the first array substrate 111 and the first opposite substrate 112; the second display panel 12 includes a second array substrate 121 and a second opposite substrate 122, and a liquid crystal layer may be disposed between the second array substrate 121 and the second opposite substrate 122. Edge sealing layers 14 may be provided on side surfaces of the first array substrate 111 and the first opposite substrate 112 facing the side frame 21. The edge sealing layers 14 on the side surfaces of the first array substrate 111 and the first opposite substrate 112 may be formed into a single piece. The edge sealing layer 14 may be a light shielding layer for preventing external light from entering the first display panel 11 to affect displaying.

As shown in FIG. 6, the first display panel 11 may further include a first upper polarizer 113 and a first lower polarizer 114, the second display panel 12 may further include a second upper polarizer 123 and a second lower polarizer 124, the first upper polarizer 113 is disposed on a side of the first opposite substrate 112 away from the first array substrate 111, and the first lower polarizer 114 is disposed on a side of the first array substrate 111 away from the first opposite substrate 112; the second upper polarizer 123 is disposed on a side of the second opposite substrate 122 away from the second array substrate 121, and the second lower polarizer 124 is disposed on a side of the second array substrate 121 away from the second opposite substrate 122. The connection layer 13 is connected between the first lower polarizer 114 and the second upper polarizer 123. The first upper polarizer 113 overlaps with the edge sealing layer 14 in an overlap region along a direction in which the first upper polarizer 113 extends. For example, a width c (e.g., a dimension in a direction extending from the first array substrate 111 or the first opposite substrate 112 to the edge sealing layer 14) of the overlap region between the first upper polarizer 113 and the edge sealing layer 14 is about 0.2 mm.

In some implementations, as shown in FIG. 4, the backlight module 30 includes a back plate 31, a glue frame 32, and a backlight assembly 34, where the back plate 31 has an accommodating part 31s. For example, as shown in FIG. 4, the back plate 31 includes a bottom wall 311 and a side wall 312 coupled to the bottom wall 311, and the bottom wall 311 and the side wall 312 define the accommodating part 31s of the back plate 31. The backlight assembly 34 is disposed in the accommodating part 31s, and the backlight assembly 34 includes a structure for providing a uniform light source to the panel assembly 10. For example, the backlight assembly 34 may include a light source, a light guide plate, an optical film, and the like, the light source may be disposed on a light incident surface of the light guide plate, the optical film may be disposed on a light emitting surface of the light guide plate, multiple optical films may be provided, and the optical films may include a diffusion film, a prism film and so on.

The glue frame 32 includes a retaining wall 321 and a second supporting part 322 on the retaining wall 321, and the retaining wall 321 is disposed around the back plate 31. The retaining wall 321 is coupled to the side wall 312 of the back plate 31, and the specific connection manner is not limited, for example, a hook may be disposed on the side wall 312 of the back plate 31, a slot may be disposed on the retaining wall 321, and the retaining wall 321 may be coupled to the side wall 312 by the hook being clamped in the slot. The side frame 21 is positioned on a side of the retaining wall 321 away from the back plate 31, and the second display panel 12 is supported by the second supporting part 322.

In some implementations, a second adhesive layer 40 is disposed between the second supporting part 322 and the second display panel 12, and the second supporting part 322 is adhered to the second display panel 12 through the second adhesive layer 40 and supports the second display panel 12. For example, the second adhesive layer 40 includes a foam adhesive tape.

In some implementations, a first adhesive layer 24 is disposed on a surface of the side frame 21 facing the backlight module 30, and the backlight module 30 may be adhered to the side frame 21 through the first adhesive layer 24, so as to improve an entire stability of structure of the display device. For example, the glue frame 32 of the backlight module 30 is adhered to the side frame 21 by the first adhesive layer 24. In addition, the second display panel 12 may also be adhered to the side frame 21 by the first adhesive layer 24.

For example, the first adhesive layer 24 is a double-sided adhesive tape, or an adhesive layer formed by curing an adhesive.

In some implementations, a hook 21a is disposed on a surface of the side frame 21 facing the glue frame 32, a slot matching with the hook 21a is disposed on a surface of the glue frame 32 facing the side frame 21, and the hook 21a is clamped in the slot, so as to further increase a stability of connection between the side frame 21 and the glue frame 32 and facilitate an detachment. Certainly, a slot may be provided on the surface of the side frame 21 facing the glue frame 32, and a hook may be provided on the surface of the glue frame 32 facing the side frame 21 to clamp the hook in the slot.

In some implementations, as shown in FIG. 4, a first buffer layer BL1 is disposed on a surface of the first supporting part 22 facing the first display panel 11, a second buffer layer BL2 is disposed on a surface of the first supporting part 22 facing the second display panel 12, and the first buffer layer BL1 and the second buffer layer BL2 are disposed to prevent the first supporting part 22 from scratching or colliding with the first display panel 11 or the second display panel 12. The first buffer layer BL1 and the second buffer layer BL2 each may be made of a flexible material, for example, a resin material such as polyimide, polycarbonate, or polyacrylate.

In some examples, as shown in FIG. 6, orthographic projections of the first lower polarizer 114, the second upper polarizer 123 and the connection layer 13 on the first display panel 11 substantially coincide, and orthographic projections of the first lower polarizer 114 and the first supporting part 22 on the first display panel 11 do not overlap; orthographic projections of the second upper polarizer 123 and the first supporting part 22 on the first display panel 11 do not overlap. Illustratively, as shown in FIGS. 4 and 5, a total thickness of the connection layer 13, the first lower polarizer 114, and the second upper polarizer 123 is greater than or equal to a total thickness of the first supporting part 22, the first buffer layer BL1, and the second buffer layer BL2. In such mode, when the display device is not applied with an external force, a gap is formed between the first buffer layer BL1 and the first display panel 11, and/or, between the second buffer layer BL2 and the second display panel 12, which can further prevent the first display panel 11 and the second display panel 12 from being collided.

Specifically, there may be a non-zero first distance between the first buffer layer BL1 and the first display panel 11, and a non-zero second distance between the second buffer layer BL2 and the second display panel 12. For example, the first distance and the second distance each may range from 0.05 mm to 0.1 mm, thereby further ensuring that the first display panel 11 and the second display panel 12 are not collided without significantly affecting a thickness of the display device.

It should be noted that the above range of the first distance and the second distance is true when the display device is not subjected to an external force.

In some examples, a thickness of the connection layer 13 may range from 0.8 mm to 1 mm, for example, the thickness of the connection layer 13 may be about 0.9 mm.

Figure 7:
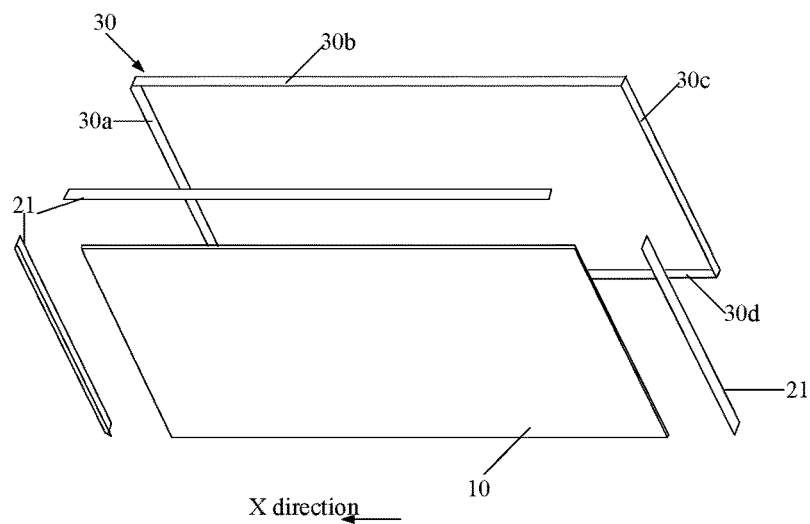
FIG. 7 is an exploded view of a side frame, a panel assembly and a backlight module according to an embodiment of the present disclosure.
Figure 8:
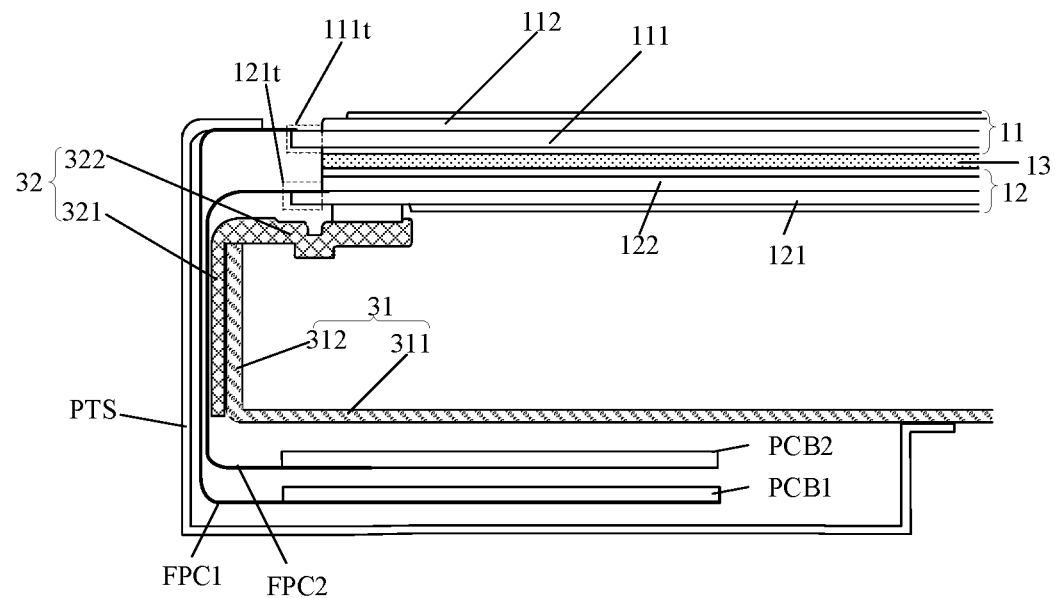
FIG. 8 is a cross-sectional view taken along line B-B' of FIG. 3.
Figure 9:
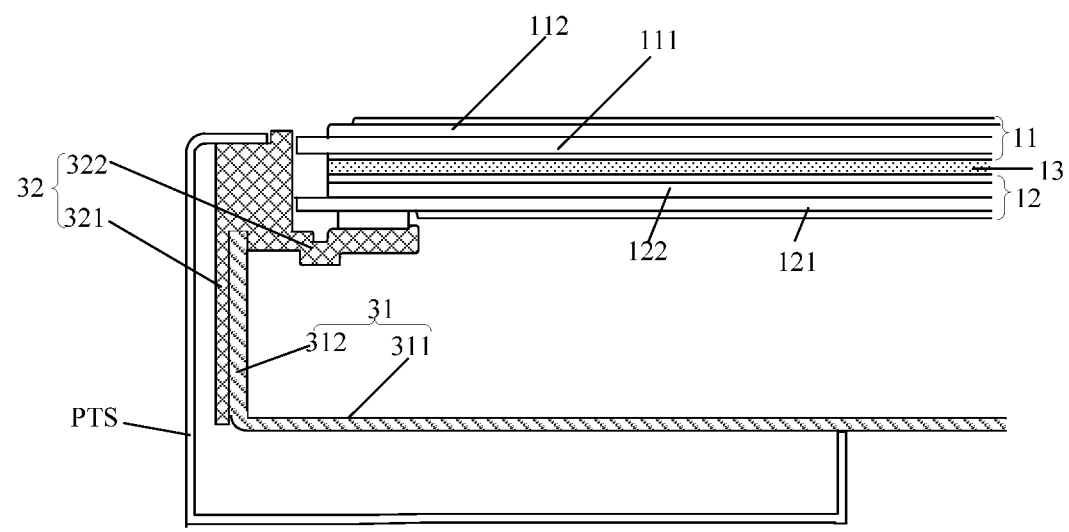
FIG. 9 is a cross-sectional view taken along line C-C' of FIG. 3.

FIG. 7 is an exploded view of a side frame, a panel assembly and a backlight module according to an embodiment of the present disclosure, and as shown in FIG. 7, the backlight module 30 is a rectangular structure, and has a first edge 30a, a second edge 30b, a third edge 30c and a fourth edge 30d connected in sequence, the number of the side frames 21 is three, and the three side frames 21 are respectively adjacent to the first edge 30a, the second edge 30b and the third edge 30c of the backlight module 30, that is, the three side frames 21 are respectively adjacent to and approximately parallel to the first edge 30a, the second edge 30b and the third edge 30c. The first supporting part may be disposed on each side frame 21. In such case, a cross-sectional view taken along line I-I' and a cross-sectional view taken along line J-J' in FIG. 3 are the same as or similar to that in FIG. 4. FIG. 8 is a cross-sectional view taken along line B-B' of FIG. 3, FIG. 9 is a cross-sectional view taken along line C-C' of FIG. 3, and the backlight assembly is not illustrated in FIGS. 8 and 9. Referring to FIGS. 7 to 9, the first array substrate 111 includes a first driving region 111t proximal to the fourth edge 30d of the backlight module 30, and a length direction of the first driving region 1ilt is a direction (i.e., an X direction in FIG. 7) in which the fourth edge 30d extends. An orthographic projection of the first driving region lilt on the bottom wall 311 of the back plate 31 exceeds an orthographic projection of the first opposite substrate 112 on the bottom wall 311 of the back plate 31; the second array substrate 121 includes a second driving region 121t adjacent to the fourth edge 30d of the backlight module 30, and an orthographic projection of the second driving region 121t on the bottom wall 311 of the back plate 31 exceeds an orthographic projection of the second opposite substrate 122 on the bottom wall 311 of the back plate 31.

The display device of the embodiment of the present disclosure may further include a first flexible printed circuit FPC1 and a second flexible printed circuit FPC2, an end of the first flexible printed circuit FPC1 is coupled to the first driving region lilt, and another end of the first flexible printed circuit FPC1 is coupled to a first driving printed circuit board PCB1; an end of the second flexible wiring board FPC2 is coupled to the second driving region 121t, and another end of the second flexible printed circuit FPC2 is coupled to a second driving printed circuit board PCB2. The first driving printed circuit board PCB1 and the second driving printed circuit board PCB2 are positioned on a side of the back plate 31 away from the panel assembly 10. The first driving region lilt and the second driving region 121t each are provided with a connection electrode therein, and the first flexible printed circuit FPC1 being coupled to the first driving region lilt (or the second flexible printed circuit FPC2 being coupled to the second driving region 121t) means that the first flexible printed circuit FPC1 is coupled to the connection electrode in the first driving region 111t (or the second flexible printed circuit FPC2 is coupled to the connection electrode in the second driving region 121t).

In order to prevent the first flexible printed circuit FPC1, the second flexible printed circuit FPC2, the first driving printed circuit board PCB1, and the second driving printed circuit board PCB2 from being damaged, as shown in FIGS. 8 and 9, the display device according to the embodiment of the present disclosure may further include a protective shell PTS, an end of the protective shell PTS is coupled to the glue frame 32, and another end of the protective shell PTS is coupled to the bottom wall 311 of the back plate 31, a protective space is defined between the protective shell PTS and the glue frame 32, and between the protective shell PTS and the bottom wall 311 of the back plate 31, and a part of the first flexible printed circuit FPC1, a part of the second flexible printed circuit FPC2, the first driving printed circuit board PCB1, and the second driving printed circuit board PCB2 may be positioned in the protective space.

The assembly process of the display device in the embodiment of the present disclosure is as follows: firstly, assembling parts of the backlight module 30; and assembling the panel assembly 10; then, fixing the panel assembly 10 onto the backlight module 30; then, clamping the hook (or the slot) on the side frame 21 in the slot (or the hook) on the glue frame 32, and ensuring the first supporting part 22 on the side frame 21 extending into the accommodation space 10s defined by the first display panel 11, the second display panel 12 and the connection layer 13, and ensuring the first adhesive layer 24 on the side frame 21 to be adhered to the glue frame 32 and the second display panel 12.

It will be understood that the above embodiments and implementations are merely exemplary embodiments and implementations employed to illustrate the principles of the present disclosure, and the present disclosure is not limited thereto. It will be apparent to those skilled in the art that various changes and modifications can be made therein without departing from the spirit and scope of the present disclosure, and these changes and modifications are also considered to fall within the scope of the present disclosure.

The invention claimed is:

1. A display device, comprising:
   a backlight module;
   a plurality of side frames positioned at a periphery of the backlight module, the side frames are respectively positioned on different sides of the backlight module, and are coupled to the backlight module; a first supporting part is provided on at least one of the side frames, and the first supporting part extends toward a middle part of the backlight module;
   a panel assembly positioned on a light-emitting side of the backlight module and comprising a first display panel, a second display panel and a connection layer, wherein the connection layer is connected between the first display panel and the second display panel, the first display panel, the second display panel and the connection layer define an accommodation space, the first supporting part extends into the accommodation space, the first display panel is positioned on a side of the first supporting part away from the backlight module, and the second display panel is positioned on a side of the first supporting part proximal to the backlight module and supported by the backlight module,
   wherein there is an overlap between an orthographic projection of the first display panel and an orthographic projection of the side frame on a plane in which the first display panel extends, so that the first display panel overlaps with the side frame in an overlap region along a direction in which the first display panel extends,
   a first buffer layer is provided on a surface of the first supporting part facing the first display panel, and a second buffer layer is provided on a surface of the first supporting part facing the second display panel,
   there is a first distance between the first buffer layer and the first display panel, and there is a second distance between the second buffer layer and the second display panel.

2. The display device according to claim 1, wherein a first adhesive layer is disposed on a surface of each side frame facing the backlight module, and the backlight module is adhered to each side frame through the first adhesive layer.

3. The display device according to claim 1, wherein the backlight module comprises:
   a back plate formed with an accommodating part;
   a backlight assembly disposed in the accommodating part;
   a glue frame comprising a retaining wall and a second supporting part on the retaining wall, the retaining wall is arranged around the back plate; the side frame is positioned on a side of the back plate away from the retaining wall, and the second display panel is supported by the second supporting part.

4. The display device according to claim 3, wherein one of the side frame and the glue frame is provided with a hook, and the other one of the side frame and the glue frame is provided with a slot, and the hook is clamped in the slot.

5. The display device according to claim 3, wherein a second adhesive layer is provided between the second supporting part and the second display panel.

6. The display device according to claim 5, wherein the second adhesive layer comprises a foam adhesive tape.

7. The display device according to claim 1, wherein the connection layer comprises an adhesive layer.

8. The display device according to claim 1, wherein the first distance and the second distance each range from 0.05 mm to 0.1 mm.

9. The display device according to claim 1, wherein the first display panel comprises an array substrate and an opposite substrate which are oppositely arranged, and edge sealing layers are arranged on a side surface of the array substrate facing the side frame and a side surface of the opposite substrate facing the side frame.

10. The display device according to claim 9, wherein the edge sealing layer on the side surface of the array substrate facing the side frame and the edge sealing layer on the side surface of the opposite substrate facing the side frame are formed into a single piece as a light shielding layer.

11. The display device according to claim 9, wherein the backlight module has a first edge, a second edge, a third edge and a fourth edge, the array substrate comprises a first driving region proximal to the fourth edge, and the display device further comprises a first flexible printed circuit coupled to the first driving region;
   the number of the side frames is three, and the three side frames are respectively adjacent to the first edge, the second edge and the third edge.

12. The display device according to claim 1, wherein an orthographic projection of an edge of the first supporting part away from the side frame on the first display panel is a straight line or a curved line.

13. The display device according to claim 1, wherein the first supporting part on a same one of the side frames is a continuous structure, or comprises a plurality of parts arranged at intervals.

14. The display device according to claim 11, further comprising a protective shell, a protective space is defined between the protective shell and the backlight module, wherein a part of the first flexible printed circuit is positioned in the protective space.

* * * * *